USO11432682B2

(12) United States Patent
Li et al.

(10) Patent No.: US 11,432,682 B2
(45) Date of Patent: Sep. 6, 2022

(54) IMPLEMENT FOR STIRRING OR COMMINUTING FOOD

(71) Applicant: De'Longhi Braun Household GmbH, Neu-Isenburg (DE)

(72) Inventors: Yang Li, Munich (DE); Dominik Wirth, Stuttgart (DE)

(73) Assignee: DE'LONGHI BRAUN HOUSEHOLD GMBH, Neu-Isenburg (DE)

( * ) Notice: Subject to any disclaimer, the term of this patent is extended or adjusted under 35 U.S.C. 154(b) by 0 days.

(21) Appl. No.: 16/637,149

(22) PCT Filed: Jul. 10, 2018

(86) PCT No.: PCT/EP2018/068631
§ 371 (c)(1),
(2) Date: Feb. 6, 2020

(87) PCT Pub. No.: WO2019/029928
PCT Pub. Date: Feb. 14, 2019

(65) Prior Publication Data
US 2020/0359840 A1 Nov. 19, 2020

(30) Foreign Application Priority Data
Aug. 8, 2017 (DE) .......................... 102017213778.9

(51) Int. Cl.
*A47J 43/044* (2006.01)
*A47J 43/08* (2006.01)

(52) U.S. Cl.
CPC ........... *A47J 43/044* (2013.01); *A47J 43/082* (2013.01); *A47J 2043/04427* (2013.01)

(58) Field of Classification Search
CPC .................... A47J 43/044; A47J 43/082; A47J 2043/04427
(Continued)

(56) References Cited

U.S. PATENT DOCUMENTS 4,480,926 A * 11/1984 Lattery, Jr. ............ A47J 43/044
366/130
4,708,487 A * 11/1987 Marshall ................ A23G 9/045
366/279
(Continued)

FOREIGN PATENT DOCUMENTS

CN 101856200 A 10/2010
CN 202341837 U 7/2012
(Continued)

OTHER PUBLICATIONS

English translation International Search Report of the International Searching Authority, dated Oct. 23, 2018, with respect to International Application No. PCT/EP2018/068631.
(Continued)

*Primary Examiner* — Marc C Howell
(74) *Attorney, Agent, or Firm* — Scott R. Cox

(57) ABSTRACT

An implement for stirring or comminuting food including a rotatable shaft which is driven by a motor, a working part provided on an end of said shaft opposite to the motor, and an inner assembly and an outer assembly which define a housing of the implement. The inner assembly is movable within the outer assembly. The inner assembly rotatably bears the shaft such that the working part is situated on an outer side of the implement. The working part is provided within a shield which is provided on the outer assembly, wherein the inner assembly, together with the shaft, is movable axially with respect to the outer assembly. The inner assembly is borne with respect to the outer assembly such that axial movement of the inner assembly with respect to the outer assembly leads to a rotational movement of the outer assembly with respect to the inner assembly.

12 Claims, 7 Drawing Sheets

(58) Field of Classification Search
USPC .......................................................... 366/197
See application file for complete search history.

(56) References Cited

U.S. PATENT DOCUMENTS

| | | | |
|---|---|---|---|
| 4,738,858 A * | 4/1988 | Mukouyama | A47J 31/002 |
| | | | 426/241 |
| 5,647,546 A | 7/1997 | Sinovas et al. | |
| 5,810,472 A | 9/1998 | Penaranda et al. | |
| 5,836,684 A | 11/1998 | Safont et al. | |
| 5,863,118 A | 1/1999 | Ackel et al. | |
| 6,089,746 A | 7/2000 | Martin | |
| 6,293,691 B1 | 9/2001 | Rebordosa et al. | |
| 6,398,403 B1 | 6/2002 | Rebordosa et al. | |
| 10,258,200 B2 | 4/2019 | Wolf et al. | |
| 10,277,157 B2 | 4/2019 | Schroeder et al. | |
| 10,278,542 B2 | 5/2019 | Wolf et al. | |
| 2008/0198693 A1 | 8/2008 | Lameiro Vilarino et al. | |
| 2011/0192290 A1 | 8/2011 | Hauser et al. | |
| 2012/0228968 A1 | 9/2012 | Lee et al. | |
| 2015/0201811 A1 | 7/2015 | Riede | |
| 2019/0208960 A1 | 7/2019 | Schroeder et al. | |

FOREIGN PATENT DOCUMENTS

| | | |
|---|---|---|
| CN | 102645381 A | 8/2012 |
| CN | 205664615 U | 10/2016 |
| CN | 205885333 U | 1/2017 |
| EP | 0475470 B1 | 2/1996 |
| EP | 2394548 A1 | 12/2011 |
| FR | 2932669 A1 | 12/2009 |
| JP | 2001-511382 A | 8/2001 |
| JP | 2016030015 A | 3/2016 |
| WO | 2014133583 A1 | 9/2014 |

OTHER PUBLICATIONS

English translation of Chinese Official Report dated Dec. 14, 2021 with respect to parallel Chinese patent application No. 201880060492.
English translation of Japanese Official Report dated Mar. 22, 2021 with respect to parallel Japanese patent application No. 2020-506902.

* cited by examiner

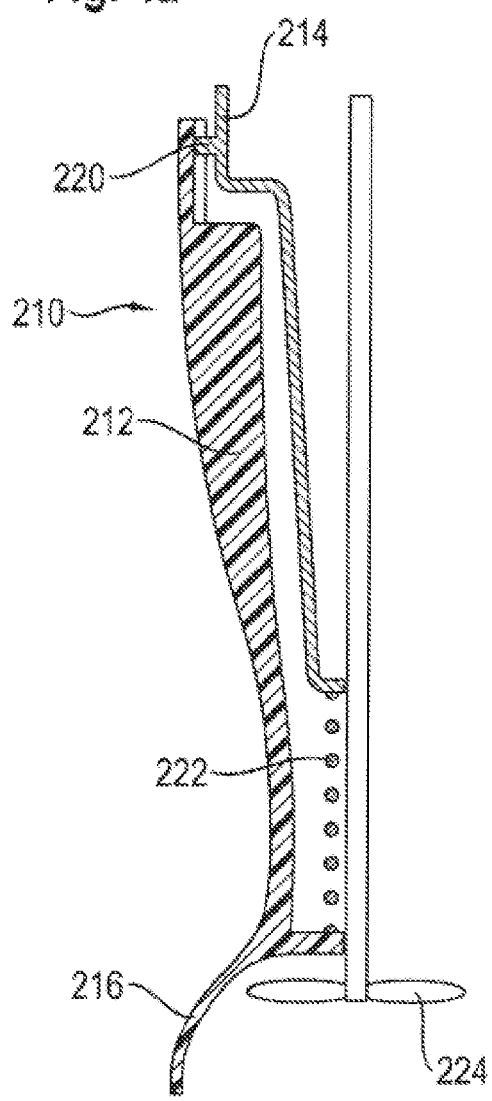
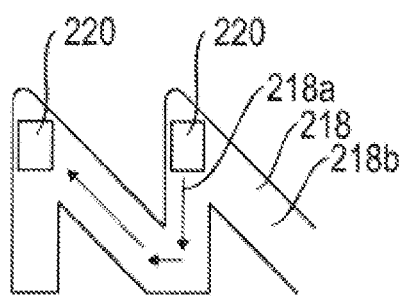
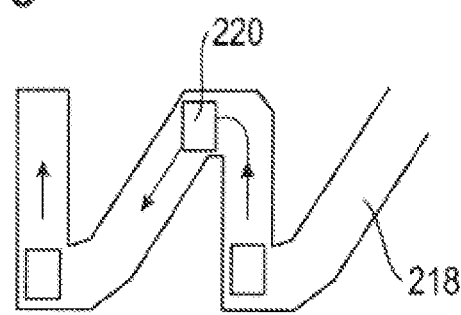

Fig. 6a
Fig. 6b
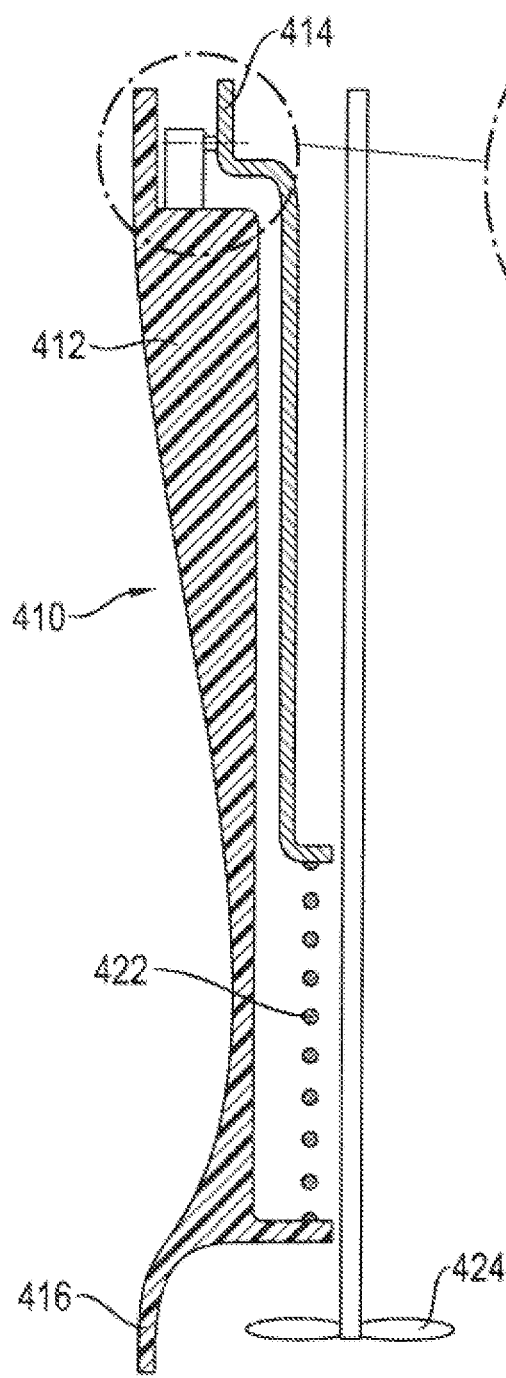
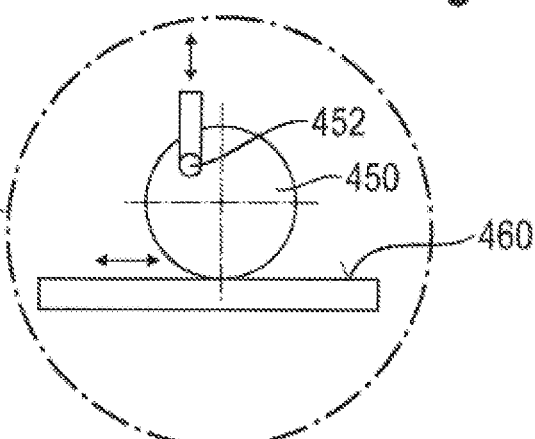

IMPLEMENT FOR STIRRING OR COMMINUTING FOOD

TECHNICAL FIELD

The present invention relates to an implement for stirring or comminuting food, such as a hand blender.

PRIOR ART

Conventional implements for stirring or comminuting food are known from WO 96/10944 A1 or EP 0 724 857 A1, for example. Such implements are used in particular for the daily preparation of food, for example to comminute and mix food. One type of implement is hand blenders, which have found widespread use both in homes and in professional catering. Such hand blenders typically have a motor housing, to which an elongated housing part, known as the shank, is connected, with the end of said shank in turn transitioning into a shield with an end that is open at the bottom, known as the bell. A drive motor is located in the motor housing, which drives a drive shaft guided through the shank, at the end of which drive shaft, in the region of the bell, a working part, such as a cutter in the form of a fast-rotating blade, is generally attached to mix liquids and comminute solid foods.

The shank generally performs the adaption of the motor housing to the shank assembly and often both the axial and radial support of the shaft that is required to drive the cutter. The bell primarily has a protective function to make it difficult for the user to reach into the blade. In addition, it serves to define a fixed distance between the blade and the base of the processing vessel (pan, mixing bowl, etc.), to optimise the flow around the blade, and as a splash guard when immersed in liquids. The bell is dimensioned such that it completely surrounds the cutter and, as seen in the direction of the axis of the drive shaft, a certain section protrudes over the end of the shaft or the cutter.

In the case of these implements available on the market, the blades are always attached in a defined horizontal position within the bell. The blades are fixedly mounted on a shaft and are generally mounted such that they are radially and axially rigid. This creates a spatially limited processing area that can be reached by the cutter. The "normal" up and down movement of the whole hand blender by the operator only increases this area marginally. At the latest when the bell abuts the base, the area underneath the cutter can no longer be reached by said cutter. Comminuting is then generally only achieved as a result of flow effects. Provided that there is sufficient liquid around the material being cut, this material will be drawn through the processing area with the flow and thus comminuted.

Furthermore, in the known hand blenders, the shank can frequently suck onto the base of the vessel while in use, which can be extremely annoying for the user since a greater amount of force is required to free the shank from the base again. This is due primarily to the position of the cutter within the bell since the geometry of the cutter that is expedient for its function creates a "propeller effect" and causes the whole shank to be sucked onto the processing base.

To avoid such disadvantages, a hand blender with an elastically deformable bell was proposed in DE 197 50 813 A1. Further approaches were pursued in DE 195 04 638 A1. Another hand blender is known from U.S. Pat. No. 6,398,403 B1.

In WO 2016/169883 A1, the applicant further proposed an implement having a working part which is movable relative to the shield.

DESCRIPTION OF THE INVENTION

The inventor noticed that if, for example, comparatively hard food is being processed (raw carrots, for instance), pieces of food move directly underneath the walls of the bell or between the bell and the base of the processing container and can get stuck there. In such a situation, the blade is no longer able to reach the food, meaning that it is no longer able to process the food. It was further established during tests that to be certain that such food residues can be reached, a force of up to 160 Newtons must be applied in order to push the wall of the bell far enough down into the food that the cutter is able to reach the food. For many users, this is not possible.

It was accordingly established that users tend to pull the implement out of the food and immerse it again elsewhere. Other, more experienced users tend to swivel the whole implement or the whole mixer, or to rotate it around the vertical axis while pressing down the implement, to ensure that the pieces of hard food move away from their location underneath the walls of the bell. However, this means that the user has to move his or her whole arm while having to simultaneously apply a (significant) vertical pressure. This is awkward for the user, and it has also transpired that the respective results of food processed in this way are significantly worse.

The inventor furthermore noticed that the system described in WO 2016/169883 A1 does indeed enable the cutter to get closer to the edge of the bell, thus mitigating the problems described above in certain situations. However, it was also established that situations were still occurring in which pieces of hard food located directly underneath the walls of the bell could not be reached by the cutter and an extremely high degree of pressure or manual rotation of the implement was required to achieve the desired objective.

The object of the invention is therefore to mitigate at least some of the problems described above.

The invention is defined in claim 1. Preferred embodiments are described in the dependent claims.

According to the invention, an implement for stirring or comminuting food has a rotatable shaft driven by a motor, provided at the end of which that is opposite the motor is a working part. Such an implement can be a hand blender or a hand mixer. The motor is typically an electric motor, but any other type of motor is also possible. The working part provided on the motor can be, for example, a blade, a cutter, a stirrer or a kneading implement (such as a stirring rod). Put generally, it can be any type of working part that can be used to process food and to this end is used in a rotary or rotationally oscillating motion.

The implement has an inner and outer assembly which at least in part define a housing ("shank") of the implement. This inner and outer assembly are components of the housing. Typically, they define an elongated outer shape of the implement. The inner assembly is provided within the outer assembly such that it is movable, and can be moved relative to the outer assembly, as is also described in WO 2016/169883 A1. The shaft is rotatably mounted in the inner assembly, the working part being located on an outer side of the implement such that it can interact with food. In other words, the working part is exposed.

However, the working part is provided within a shield which is provided on the outer assembly. This shield (which is also referred to as a "bell") is a device intended to prevent inadvertent reaching into the rotating working part. A bell of this kind is also described in WO 2016/169883 A1, for example. This shield is provided on the outer assembly, in other words it is preferably provided on this outer assembly in a fixed manner. The shield can typically be a single part or several parts but is fixedly connected to the outer assembly. This means that swiveling of the rotary shaft relative to the outer assembly necessarily results in the rotary shaft being swiveled relative to the shield.

The inner assembly is axially movable relative to the outer assembly in the direction of the shaft. In the case of such a movement, the inner assembly, together with the shaft supported by said inner assembly, is moved axially relative to the outer assembly. The inner assembly is mounted relative to the outer assembly such that an axial movement of the inner assembly relative to the outer assembly additionally leads to a rotary movement of the outer assembly relative to the inner assembly. By means of a corresponding support of the inner assembly relative to the outer assembly, the inner assembly can be swiveled relative to the outer assembly as a result of an axial movement of the inner assembly relative to the outer assembly. This then leads to the shield also swiveling relative to the working part and in relation to the motor or grip attached to the inner assembly.

Compared to WO 2016/169883 A1, this means that a telescopic movement of the shaft is replaced with a helical movement. If the user applies pressure on the implement in an axial direction, the implement is compressed, resulting in a vertical movement of the working part within the shield, while the shield itself concurrently rotates around the main axis of the implement. This means that any hard pieces of food which are stuck between the shield and the container in which this implement is being used are "scraped off", work themselves loose by means of the rotary movement or are pushed out, enabling the working part to also reach these pieces of food. The same possibly applies to residues stuck to the inside of the bell.

This rotary movement is automatically performed by the invention, without the user having to do anything "particular". This rotary movement is directly generated by the axial movement, which is the normal and intuitive direction of movement for a corresponding implement such as a hand blender, for example. The forces required are reduced accordingly and even inexperienced users can achieve better results when stirring and comminuting hard foods in particular.

It is preferable if the implement further has a pretensioning element (in the form of a spring, for example) which acts against an axial displacement of the inner assembly relative to the outer assembly. A corresponding pretensioning device leads to the implement having a defined idle position which it assumes when no axial force is being applied to the inner and outer assembly. A corresponding implement is therefore user-friendly and requires little maintenance since the inner and outer assembly have little play in the resting state. Furthermore, a separate operation is not required for resetting since the spring itself serves as a resetting element. It is particularly advantageous if this pretensioning element acts in such a manner that, in the resting state, the working part is at the furthest possible distance from the opening of the bell. This reduces the likelihood of a user inadvertently coming into contact with the working part, and the chance of the implement being sucked onto the base of the container is minimised.

It is further preferred that the maximum axial "travel" of the inner assembly relative to the outer assembly, and therefore the maximum axial travel of the implement, is at most 15 mm.

It is preferred that the support of the inner assembly relative to the outer assembly has a single projection or a plurality of projections on one or the other of the inner assembly or outer assembly and a single corresponding guide or plurality of corresponding guides on the respective other of the inner assembly or the outer assembly, which guide the one or more projections respectively. This means that the projection or plurality of projections engage with the corresponding guide. A corresponding guide could be formed by, for example, recesses in one of the respective assemblies. However, it is also conceivable that guide rails are provided which extend from the respective surface of the assembly.

The single guide or plurality of guides extend along the respective assembly such that along the direction of extension thereof, the guide or guides have both an axial extension and an extension along the periphery. As a result hereof, a movement of the single projection or plurality of projections along the guide(s) leads to a rotary movement of the outer assembly relative to the inner assembly. A corresponding configuration of the implement can easily be implemented and results in a sturdy and durable implement.

It is preferred in this respect that the guide has a series of alternating axially oriented sections and tilted sections. Such a guiding principle is known from a standard ballpoint pen, for example. As a result hereof, a first axial displacement of the inner assembly relative to the outer assembly leads to a swiveling of the working part with concurrent axial movement of the working part, while a release results in the working part being merely axially retracted. An accordingly designed working part is easy to use and has proved practical and easy to handle in practice.

Furthermore, it is preferred that the support of the inner assembly relative to the outer assembly has a single connecting member or a plurality of connecting members. Each of these connecting members has a first connecting point with the inner assembly and a second connecting point with the outer assembly, at which points they are attached to the inner or outer assembly respectively. The first connecting point and the second connecting point are set at a distance from each other. The single connecting member or plurality of connecting members have sufficient rigidity and are designed such that the application of axial pressure to the inner assembly results in a swivel movement of the single connecting member or plurality of connecting members, which leads to a rotary movement of the outer assembly relative to the inner assembly. Corresponding connecting members can easily be implemented and have proved to be sturdy and require little maintenance.

It is preferred that the connecting members have bars which are attached to the inner and outer assemblies, these being mounted such that they can be swiveled. A corresponding configuration is easy to implement.

Furthermore, it is preferred that the connecting members have leaf springs which are attached to the inner assembly and the outer assembly. The advantage of these leaf springs is that a separate resetting element is not required, or a weaker design of resetting element can be used since the leaf springs perform this resetting function at least in part.

A further preferred embodiment is that a single eccentrically mounted wheel or plurality of eccentrically mounted wheels are provided on one or the other of the inner assembly or outer assembly, which wheels may come into contact with a contact surface or are in contact with a contact surface that is provided on the respective other of the inner assembly or outer assembly and extends such that its extension has a component proceeding along the peripheral direction. The wheels and the contact surface are designed such that upon axial displacement of the inner assembly relative to the outer assembly these wheels are pressed onto the contact surface and roll along this surface by virtue of their eccentric support. As a result of this rolling, the wheels apply force to the contact surface along the peripheral direction, which leads to the rotary movement of the outer assembly relative to the inner assembly. A corresponding configuration of the implement is comparatively sturdy in terms of inadvertent rotation of the inner assembly relative to the outer assembly, making it therefore less likely that such an implement will be damaged as a result of improper use.

It is preferred here that the wheels are toothed wheels and that the contact surface has teeth elements which engage or can engage with the teeth of the toothed wheels. When a corresponding force is transmitted, comparatively high forces can be transmitted extremely easily.

Alternatively, it is sufficient if the wheels and the contact surface have or are able to make a friction wheel connection. This is advantageous by virtue of the fact that such an arrangement of the wheels and contact surface can result in a transmission of force however the wheels and contact surface are aligned, unlike in the embodiment in which the wheels are toothed wheels and the contact surface has toothed elements. As such, an implement of this kind is more user friendly.

It is further preferred that the inner assembly and the outer assembly are connected to each other by means of a thread which is designed such that an axial movement of the inner assembly relative to the outer assembly leads to a rotary movement of the outer assembly relative to the inner assembly. A corresponding design of the implement can easily be implemented and is sturdy since such an implement only has minimal play. It is hereby preferred that the thread is a ball screw, a roller thread or a sliding thread or has a thread of one of these types. Such threads have good characteristics and as such are easy to implement. A ball screw is particularly smooth-running and is therefore particularly preferred.

BRIEF DESCRIPTION OF THE DRAWINGS

FIG. 4 shows an implement according to a second embodiment.

FIG. 6 shows an implement according to a fourth embodiment.

DETAILED DESCRIPTION OF THE DRAWINGS

Figure 1A:
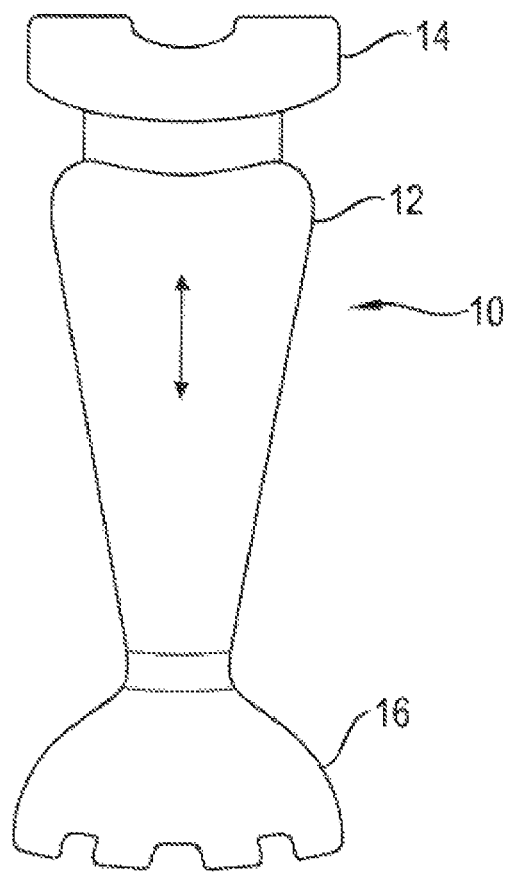
FIGS. 1a and 1b show an implement according to the prior art.

FIG. 1a shows a general view of an implement according to the prior art as described in WO 2016/169883 A1, for example.

Figure 1B:
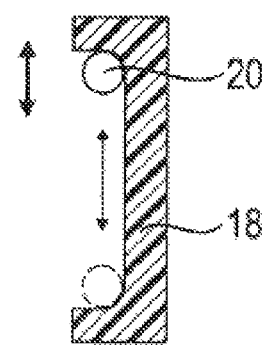

An axial movement—indicated by an arrow—of the inner assembly 14 relative to the outer assembly 12 results in an axial displacement of a blade (not shown) of the implement 10 provided within the shield 16. This is achieved, for example, by providing a guide 18 on the inner assembly 14, within which a projection 20 provided on the outer assembly 12 is guided. This guide 18 is arranged along the axial direction as shown in FIG. 1b.

A first embodiment of the invention is now described with reference to FIGS. 2a and 2b.

Figure 2A:
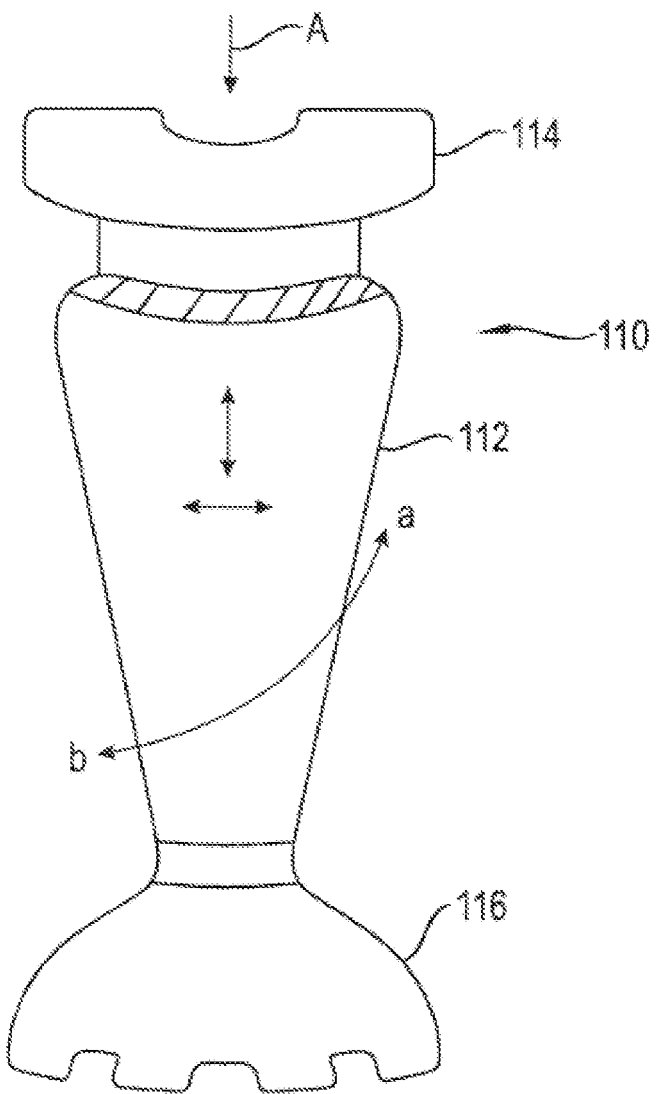
FIGS. 2a and 2b show the functionality of an implement according to the invention in accordance with the first embodiment.

FIG. 2a shows a general view of the implement 110. This implement has an inner assembly 114 and an outer assembly 112. The inner assembly 114 can be displaced relative to the outer assembly 112, as shown by the arrows in FIG. 2a. An axial movement is hereby automatically superimposed with a swiveling or a rotary movement around axis A as a result of a later described guiding of the inner assembly 114 relative to the outer assembly 112. This corresponding movement is indicated by the arrow linking points a and b. Due to a corresponding helicoidal movement, the inner assembly 114, together with a blade 124 (see FIG. 3a), is moved in a helical movement relative to the shield 116.

Figure 2B:
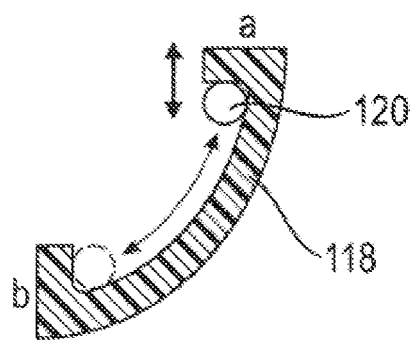

This helicoidal movement is achieved by the guiding of a projection 120 provided on the inner assembly 114 within a helicoidal guide 118, shown in FIG. 2b, provided on the outer assembly. An axial movement of the inner assembly 114 relative to the outer assembly 112 leads to the projection 120 moving along the guide 118 and thus, as shown in FIG. 2b, to an axial movement being superimposed with a swiveling movement, which leads to a helicoidal movement of the two assemblies 112, 114 towards each other.

Figure 3A:
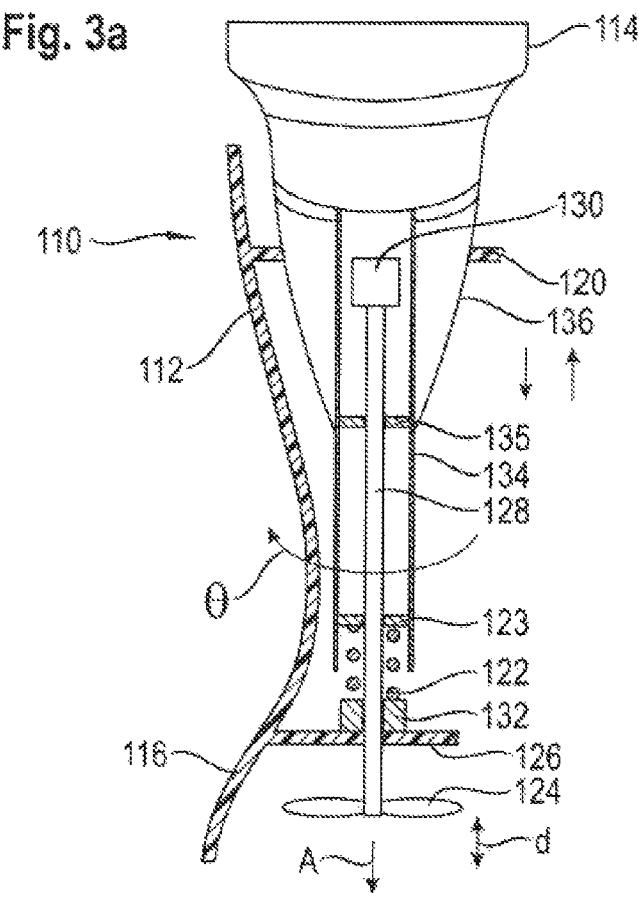
FIGS. 3a to 3c illustrate the implement according to the first embodiment.

The details of the first embodiment are further shown in FIG. 3a. As is shown in FIG. 3a, the inner assembly 114 accommodates a motor device at its upper end, which can drive the shaft 128 via the coupling 130 such that the shaft rotates around its axis. At the end of this shaft 128, which is located within the shield 116, a blade 124 is provided as an example of a working part. The shaft 128 is provided within a sleeve 134, which in turn is connected to a conical intermediate section 136 of the inner assembly. The shaft 128 is rotatably mounted within the sleeve 134 via a bearing 135.

As already mentioned, the blade 124 is located within the shield 116. This shield 116 is part of the outer assembly 112. To shield the blade 124 against the interior of the implement 110, a shield 126 is provided, through which the shaft 128 extends. A further support 132 is provided next to the shield 126. On the inside of the sleeve 134, a fixed annular arrangement 123 is further provided, against which a spring 122, as an example of a resetting element, rests. This spring 122 serves to pretension the blade 124 in a direction towards the housing such that a manual interaction from the user, for example, who presses the inner assembly 114 downwards relative to the outer assembly 112, is required in order to move the blade 124 towards the opening of the shield 116.

As is shown in FIG. 3a, the outer assembly 112 further has projections 120 on its inside surface. These projections 120 engage with guide grooves 118 provided in the intermediate section 136.

Figure 3B:
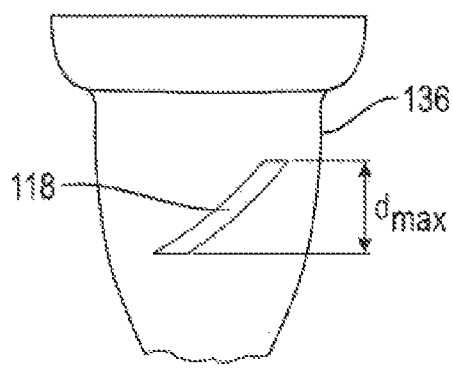

As is shown in FIG. 3b, these guide grooves have a curved shape so that they have both an axial component and a peripheral component relative to axis A. The intermediate section 136 and the guide groove 118 are designed so that the projection 120 is guided in this guide groove 118 when an axial force is applied to the inner assembly 114 such that the inner assembly is displaced relative to the outer assembly 112.

As a result of this displacement, which occurs in an axial direction, the projection 120 is moved within the groove 118, which leads to a swiveling of the inner assembly 114 relative to the outer assembly.

Figure 3C:
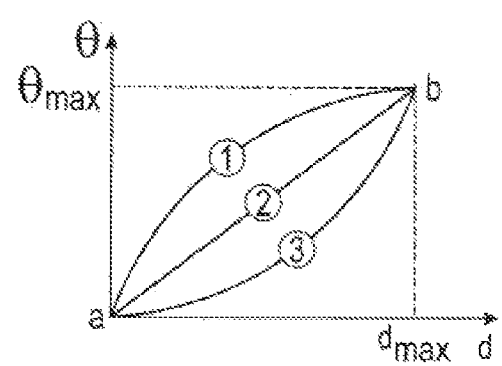

The maximum travel is indicated with d in FIGS. 3a and 3b. This maximum travel d is preferably a maximum of 15 mm, preferably between 5 and 15 mm. The tilt of the guide 118 relative to the axial direction can be selected as required. Typically, however, the angle relative to the axial direction is less than 45' at each point of the guide 118. As is shown in FIG. 3c, the swivel path can be a progressive path (indicated with "1" in FIG. 3c), a linear path (indicated with "2" in FIG. 3c) or a degressive path (indicated with "3"). In FIG. 3c, a indicates the starting point of the movement, in other words the resting state of the implement, while b indicates the end state. θ indicates the angle of rotation. The same designations are also used in FIG. 3a. $d_{max}$ indicates the maximum deflection. d indicates the respective deflection, and $θ_{max}$ indicates the maximum angular swivel.

A second embodiment of the invention is shown in FIG. 4. FIG. 4a represents a partial sectional view through the implement, while FIGS. 4b and 4c show details of the groove guide.

According to FIG. 4a, the implement 210 in turn has an inner assembly 214 and an outer assembly 212, which are pretensioned in relation to each other by means of a spring 222.

The outer assembly 212 also has a shield 216 in this embodiment, which in turn shields a blade 224 as an example of a working part.

A projection 220 in the form of a sliding block is provided in a fixed manner on the inner assembly 214. A matching groove 218, which guides the sliding block 220, is located in the outer assembly 212.

As is shown in FIG. 4b, the sliding block 220 moves downwards in a purely axial direction when an axial force is applied to the inner assembly 214. Due to a chamfer in the bottom corner of the groove, the sliding block is then guided into the diagonal part of the groove, as indicated with a horizontal arrow in FIG. 4d. If the axial force is then no longer applied, the sliding block 220 is moved through the diagonal part 218b to the end of the groove by means of the force of the spring 222, resulting in an axial movement of the inner assembly 214 combined with a swiveling movement of the shield 216 relative to the inner assembly 214. This results in a helicoidal movement.

Furthermore, it is, as shown in FIG. 4c, also possible that when an axial force is applied to the inner assembly 214 relative to the outer assembly 212, swiveling takes place, whereas only an axial movement occurs when resetting.

Furthermore, it is also possible that the sliding block is provided on the outer assembly 212 and the guide is provided on the inner assembly. Reference is made to the first embodiment and WO 2016/169883 A1 as regards details of this "ballpoint pen mechanism" and further details of the second embodiment.

Figure 5A:
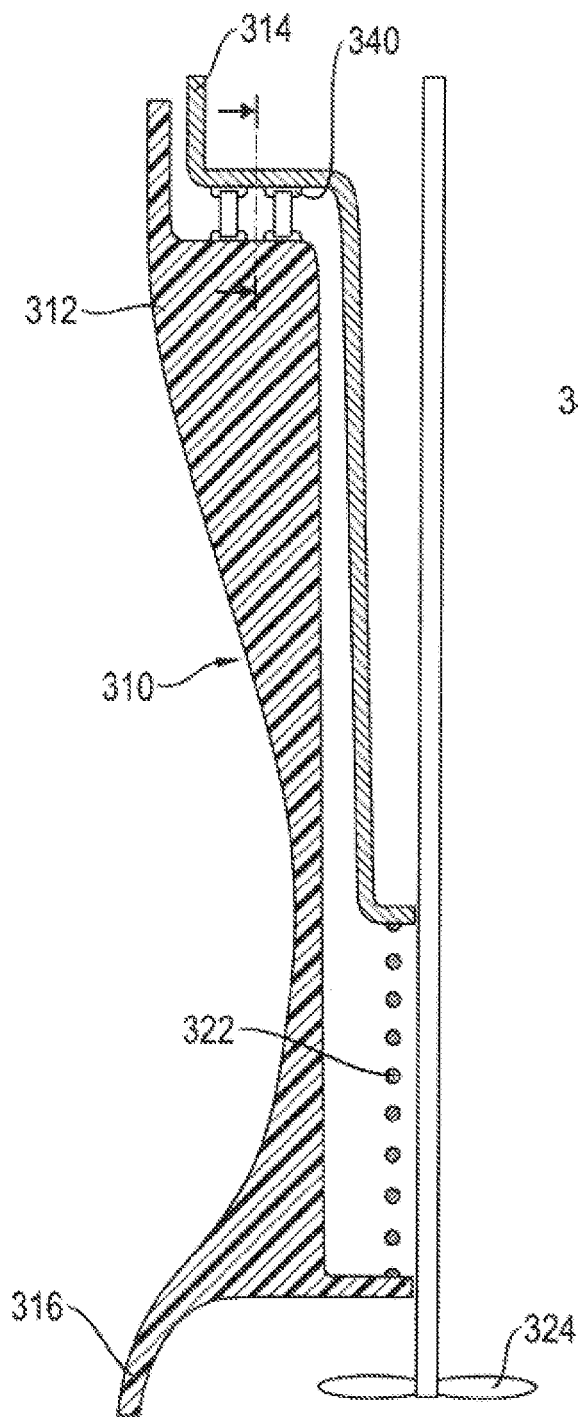
FIG. 5 shows an implement according to a third embodiment.
Figure 5B:
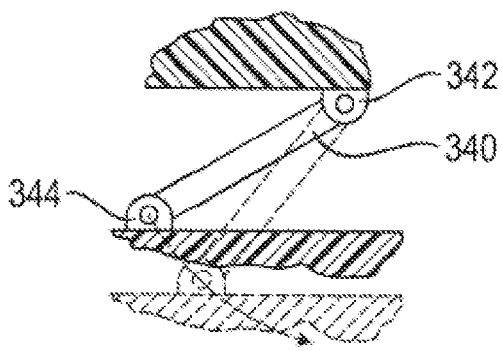

FIG. 5 shows a third embodiment of the invention, which can be understood as a "parallelogram mechanism". FIG. 5a in turn shows a partial sectional view, while FIG. 5b shows a detail of the guide. A spring 322, which pretensions the inner assembly 314 relative to the outer assembly 312, is again provided between an inner assembly 314 and an outer assembly 312 of the implement 310. In addition, a blade 324 is also provided here within a shield 316 of the outer assembly 312.

As can be seen in FIG. 5b in particular, bars 340 are provided between the inner assembly 314 and the outer assembly 312. These bars 340 are connected in a swivelable manner to the inner assembly 314 at a first connecting point 342 and to the outer assembly 312 at a second connecting point 344. By applying an axial pressure on the inner assembly 314 relative to the outer assembly 312, the bars 340 are swiveled as shown by the dotted lines in FIG. 5b. As a result, the inner assembly 314 is swiveled relative to the outer assembly 312. Resetting is carried out by the spring 322. Furthermore, it is also possible, instead of bars which can be tilted, to also provide spring elements in the form of leaf springs, which simultaneously effect guiding, tilting and the reset force. As regards further details of the third embodiment, reference is made to the first embodiment and WO 2016/169883 A1.

FIG. 6 shows a fourth embodiment of the invention. FIG. 6a is a partial sectional view of this embodiment, while FIG. 6b is a detailed view. In the case at hand, an inner assembly 414 has a wheel 450, which is mounted eccentrically by means of an axis 452 (see FIG. 6b). This wheel 450 abuts a contact surface 460 which is provided in the outer assembly 412 along the periphery.

By applying an axial force to the inner assembly 414, a force is in turn applied to the axis 452. Owing to the engagement or contact of the wheel 450 with the contact surface 460, this results in a rotation of the wheel around its geometric centre, which in turn leads to a torque which is applied to the outer assembly 412 via the contact surface 460. This in turn results in a swiveling of the outer assembly 412 and the shield 416 connected thereto relative to the interior of the inner assembly 414. The implement 410 is also reset here by means of the spring 422.

In particular, a toothed wheel can be used for the wheel 450 and a contact surface with teeth can be used for the contact surface 460.

A plurality of wheels or a plurality of toothed wheels are preferably used, which are preferably provided in a point-symmetric manner since this configuration would otherwise be comparatively unstable and could be prone to jamming.

As regards further details of the fourth embodiment, reference is made to the first embodiment and WO 2016/169883 A1.

Figure 7:
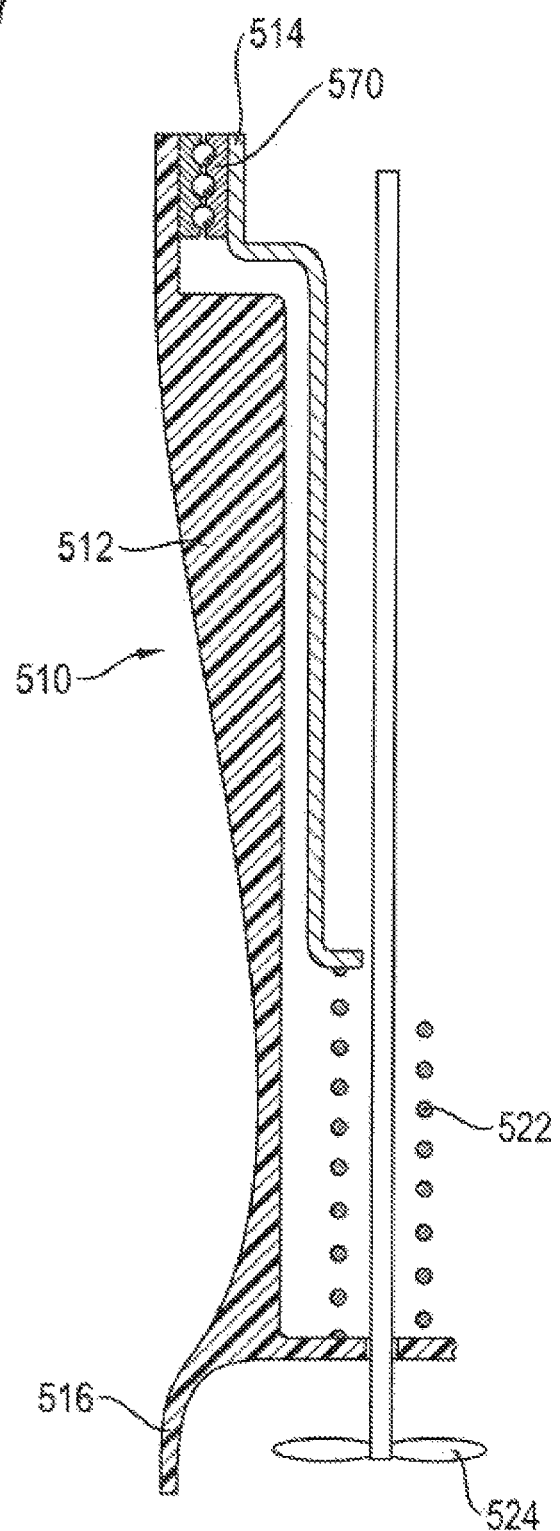
FIG. 7 shows an implement according to a fifth embodiment.

FIG. 7 shows a fifth embodiment of the invention. In this embodiment, a thread is provided between the inner assembly 514 and the outer assembly 512. For example, this can take the form of a ball screw 570, as is shown. A thread insert is provided inside the outer assembly 512, while a corresponding counterpart is provided on the outside of the inner assembly 514. When an axial force is applied, a rotary movement is created by the thread 570. It is important here that the pitch of the thread is large enough so that it is not self-locking. As a result of a corresponding rotary movement, the shield 516 and the outer assembly 512 connected thereto are swiveled relative to the inner assembly 514, which has a working part 524 mounted in the shield 516. Resetting is also achieved via a spring 522 in this case.

The invention claimed is:

1. An implement for stirring or comminuting food comprising:
   a rotary shaft driven by a motor, wherein there is provided at an end of which that is opposite the motor a working part;
   an inner assembly and an outer assembly, which at least in part define a housing of the implement,
   wherein the inner assembly is provided within the outer assembly such that the inner assembly is movable, and
   wherein the inner assembly comprises a support for the rotary shaft in such a rotatable manner that the working part is located on an outside of the implement to be able to stir or comminute food;

wherein the working part is provided within a shield that is provided on the outer assembly;

wherein the inner assembly together with the rotary shaft supported thereby is axially movable relative to the outer assembly in the direction of the shaft, and wherein the inner assembly is supported relative to the outer assembly such that an axial movement of the inner assembly in relation to the outer assembly leads to a rotary movement of the outer assembly relative to the inner assembly.

2. The implement according to claim 1, wherein the support of the inner assembly relative to the outer assembly comprises a single projection or a plurality of projections on one or the other of the inner assembly or outer assembly and a single corresponding guide or plurality of corresponding guides on the respective other of the inner assembly or outer assembly, which guide the single projection or plurality of projections; and wherein the single guide or plurality of guides extend along the respective assembly such that along a direction of extension thereof, the guide or guides have both an axial extension and an extension along a periphery, such that a movement of the single projection or plurality of projections along the guide or guides leads to a rotary movement of the outer assembly relative to the inner assembly.

3. The implement according to claim 2, wherein the guide comprises a series of alternating axially oriented sections and tilted sections.

4. The implement according to claim 1, wherein the support of the inner assembly relative to the outer assembly comprises one or more connecting members;

wherein the one or more connecting members have a first connecting point with the inner assembly and a second connecting point with the outer assembly, at which points they are connected to the inner and outer assembly respectively;

wherein the first connecting point and the second connecting point are set at a distance from each other; and wherein the one or more connecting members have such a rigidity and are designed such that application of an axial pressure on the inner assembly leads to a swivelling movement of the one or more connecting members, which leads to a rotary movement of the outer assembly relative to the inner assembly.

5. The implement according to claim 4, wherein the one or more connecting members comprise bars which are attached to the inner assembly and the outer assembly, wherein said bars are mounted such that they can be swivelled.

6. The implement according to claim 5, wherein the one or more connecting members further comprise leaf springs which are attached to the inner assembly and the outer assembly.

7. The implement according to claim 1, further comprising a single eccentrically mounted wheel or plurality of eccentrically mounted wheels provided on one or the other of the inner assembly or outer assembly, which wheels may come into contact with a contact surface or are in contact with said contact surface that is provided on the respective other of the inner assembly or outer assembly and which extend such that its extension comprises a component proceeding along a peripheral direction, and wherein in the event of an axial movement of the inner assembly relative to the outer assembly, the wheel or wheels roll along the contact surface such that they apply a force acting in a peripheral direction to the contact surface which leads to a rotary movement of the outer assembly relative to the inner assembly.

8. The implement according to claim 7, wherein the wheel or wheels comprise toothed wheels and the contact surface comprises teeth elements which engage or can engage with the teeth of the toothed wheel or wheels.

9. The implement according to claim 7, wherein the wheel or wheels and the contact surface have or are able to make a friction wheel connection.

10. The implement according to claim 1, wherein the inner assembly and the outer assembly are connected to each other by a thread which is designed such that axial movement of the inner assembly relative to the outer assembly leads to rotary movement of the outer assembly relative to the inner assembly, and wherein the thread comprises an element selected from the group consisting of a ball screw, a roller thread and a sliding thread.

11. An implement for stirring or comminuting food comprising:

a rotary shaft driven by a motor, wherein there is provided at an end of which that is opposite the motor a working part;

an inner assembly and an outer assembly, which at least in part define a housing of the implement, wherein the inner assembly is provided within the outer assembly such that the inner assembly is movable, and wherein the inner assembly comprises a support for the rotary shaft in such a rotatable manner that the working part is located on an outside of the implement to be able to stir or comminute food;

wherein the working part is provided within a shield that is provided on the outer assembly;

wherein the inner assembly together with the rotary shaft supported thereby is helicoidally movable relative to the outer assembly in the direction of the shaft, and wherein the inner assembly is supported relative to the outer assembly such that an axial movement of the inner assembly in relation to the outer assembly leads to a rotary movement of the outer assembly relative to the inner assembly.

12. An implement for stirring or comminuting food comprising:

a rotary shaft driven by a motor, wherein there is provided at an end of which that is opposite the motor a working part;

an inner assembly and an outer assembly, which at least in part define a housing of the implement, wherein the inner assembly is provided within the outer assembly such that the inner assembly is movable, and wherein the inner assembly comprises a support for the rotary shaft in such a rotatable manner that the working part is located on an outside of the implement to be able to stir or comminute food;

wherein the working part is provided within a shield that is provided on the outer assembly;

wherein the inner assembly together with the rotary shaft supported thereby is axially movable relative to the outer assembly in the direction of the shaft, wherein the inner assembly is supported relative to the outer assembly such that an axial movement of the inner assembly in relation to the outer assembly leads to a rotary movement of the outer assembly relative to the inner assembly; and wherein the support of the inner assembly relative to the outer assembly comprises a single projection or a plurality of projections on one or the other of the inner assembly or outer assembly and a single corresponding guide or plurality of corresponding guides on the respective other of the inner assembly or outer assembly, which guides the single projection or plurality of projections.

* * * * *